Patented Apr. 9, 1940

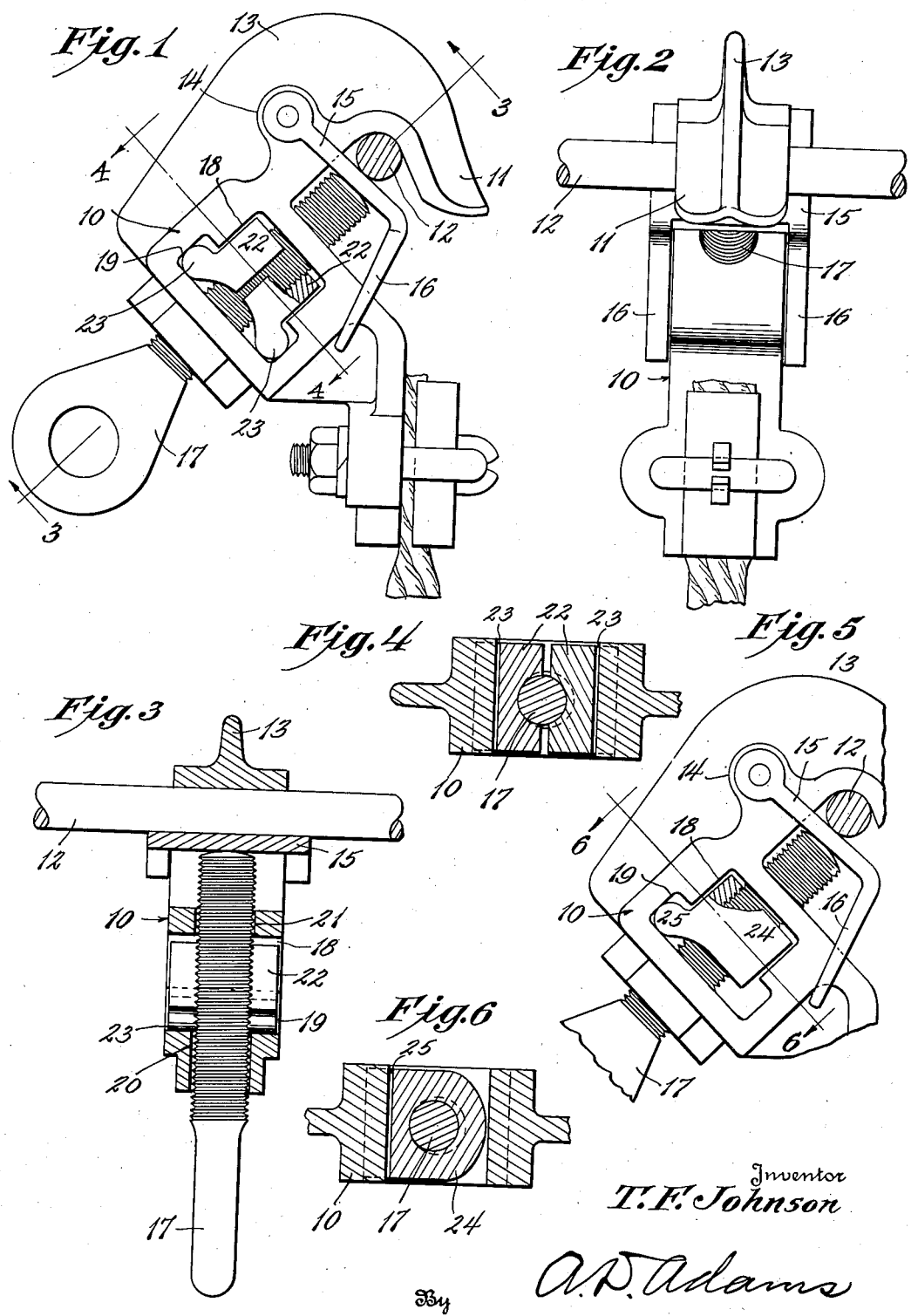

2,196,359

UNITED STATES PATENT OFFICE 2,196,359

TAP CLAMP

Tomlinson F. Johnson, Atlanta, Ga.

Application July 7, 1936, Serial No. 89,410

8 Claims. (Cl. 173—273)

This invention relates to tap clamps for high voltage transmission lines and aims, among other objects, to provide novel means to hold a screw clamp to prevent it from becoming loose on account of vibrations of the conductor. Another aim of the invention is to provide novel means to hold a screw clamp in gripped engagement with a conductor and prevent the screw from loosening due to ordinary vibrations. More specifically, the invention aims to provide certain improvements in the type of clamp shown and described in my copending application, Ser. No. 54,131, filed December 12, 1935.

Other aims and advantages of the invention will appear in the specification, when considered in connection with the accompanying drawing, wherein:

Fig. 1 is a side elevation of one form of clamp embodying the invention;

Fig. 2 is a front elevation of the clamp shown in Fig. 1;

Fig. 3 is a sectional view taken on the line 3—3 of Fig. 1;

Fig. 4 is a sectional view taken on the line 4—4 of Fig. 1;

Fig. 5 is a side elevation, partly in section, showing a modified form of the clamping nut; and Fig. 6 is a sectional view taken on the line 6—6 of Fig. 5.

Referring particularly to the drawing, the clamp there shown for illustrative purposes is of the same general type as that disclosed in my Patent No. 1,900,990 of March 14, 1933. However, the improvements may be applied to many different types of clamps. It is shown as embodying a hook-shaped body 10 having a curved bill 11 adapted to engage a conductor 12. The hook is reinforced by a vertical rib 13 having lateral bosses to which an H-shaped clamping member 15 is pivoted and the clamping member has downwardly bent arms 16 to guide the hook on a conductor when the clamp is manipulated by a stick or manipulating implement such as is shown in my copending application, Ser. No. 46,014, filed October 21, 1935, issued as Patent 2,095,137 on October 5, 1937.

In this instance, clamping pressure is applied to the clamping member 15 by means of an eye-bolt 17 having a screw threaded shank which passes through the body portion of the clamp. Herein, the body portion of the clamp is enlarged at the lower end to present a nut holding frame in the form of a rectangular opening 18 having lateral recesses or channels on opposite sides at the bottom and the eye-bolt 17 extends freely through enlarged openings 20 and 21 in the hook body above and below the vent or pocket. In Figs. 1, 3 and 4 a split nut is inserted in the frame for engaging the screw threads of the eye-bolt and comprises complemental nut parts 22 loosely fitted but nonrotatable in the opening or pocket 18 having downwardly inclined lateral wings or arms 23 engaging the bottom and sides of the recesses or channels 19. The lateral wings or arms 23 are shown as being rounded and the arrangement is such that, as the bolt is tightened, the nut parts are tilted or canted toward each other in firm gripping engagement with the bolt threads. Each nut part is shown as being less than a half nut to permit them to move inwardly and grip against the bottoms of the threads on the shank of the bolt. The idea is to provide a self-gripping nut for the bolt without a washer of any kind, so that the bolt cannot be loosened by ordinary vibrations. Furthermore, the arrangement is such that the nut parts may be inserted laterally into the opening 18 and enlargements or recesses 19 before the eye-bolt is inserted through the frame or yoke. They loosely engage the bolt threads as the bolt is screwed into place and are locked in the pocket or opening by the bolt. Furthermore, the upwardly converging inclined faces of the arms initially guide the bolt into the nut openings. Thus, the nut parts are self-centering.

Referring to Figs. 5 and 6, the body of the clamp is shown as being the same as that shown in Figs. 1 to 4 inclusive. In this example, the eye-bolt passes through a whole nut 24 loosely fitted in the opening or pocket and having a single lateral wing or arm 25 seated in one side of the rectangular enlargement 19 so that the nut cants to one side as the eye-bolt tightens the clamp. In this instance, the upper left hand side and the lower right hand side of the nut 24 grip firmly against the threads of the bolt 17 when it is tightened and, the more it is tightened, the firmer the grip of the nut against it so that the single nut is self-gripping without requiring any lock washer.

In both examples, the nuts are preferably made of rustproof metal, such as copper or bronze; while the clamp body is preferably made of cast aluminum or a suitable alloy which is a good conductor, and the eye-bolt is conveniently made of galvanized metal. The eye-bolt is firmly gripped in its clamping position without requiring the use of the ordinary lock washers or any extra parts and either form of nut may be used in the same clamp body. Due to the gripping action, the screw threads cannot be stripped due to excessive tightening, as is the case with ordinary screw clamps.

Obviously, the present invention is not restricted to the particular embodiments thereof herein shown and described.

What is claimed is:

1. In combination with a tap clamp comprising a body having a conductor engaging a hook, a non-circular pocket in the body opposite from the hook; a nut loosely and non-rotatably mounted in said pocket; a clamping bolt passing through the body and the nut into the bight portion of the hook and coacting means on the nut and body to tilt the nut into firm gripping and holding engagement with the bolt threads as the bolt is tightened and grips a conductor.

2. In combination with a tap clamp comprising a body having a conductor engaging a hook, a non-circular pocket in the body opposite from the body and having lateral enlargements on opposite sides; a nut non-rotatably mounted in said pocket including complemental nut parts each having a lateral arm projecting into the respective enlargements; and a clamping bolt threaded through the nut and extending into the bight portion of the hook, said lateral arms coacting with the walls of the pocket to tilt or cant the nut parts into firm gripping engagement with the bolt when it is tightened and grips a conductor to prevent stripping the threads and loosening of the clasp due to ordinary vibrations.

3. In combination with a tap clamp comprising a body having a conductor engaging hook, a substantially rectangular pocket formed in the body portion opposite the hook and having lateral channel shaped enlargements in the opposite sides at the lower end; a split nut loosely and non-rotatably mounted in said rectangular pocket; an angular projection on the outside of each part of the nut presenting a rounded portion engaging in the respective channel-shaped enlargements; and a clamping bolt threaded through said split nut and extending through the body into the bight of the hook, the arrangement being such that the bolt, when it is tightened to grip a conductor causes the nut parts to lock on said projection and firmly grip the bolt so as to prevent loosening due to vibration and stripping of the threads when the bolt is tightened.

4. In combination with a tap clamp comprising a body having a conductor engaging hook, a non-circular pocket in the body opposite the hook and having a lateral recess; a nut loosely and non-rotatably mounted in the pocket; a clamping bolt threaded through the nut and extending into the bight portion of the hook; and a lateral lug on one side of the nut extending into said lateral recess adapted to tilt the nut into firm gripping engagement with the bolt when the bolt is tightened to grip a conductor.

5. In combination with a tap clamp comprising a clamping body having a conductor engaging hook, a substantially rectangular nut pocket in the body opposite the hook and having lateral recesses at the bottom; a single nut loosely and non-rotatably mounted in said pocket and having a lateral angular projection extending into one of said recesses; and a clamping bolt threaded through said nut and extending through the body into the bight of the hook whereby the nut is tilted to one side firmly to grip the bolt when the bolt is tightened, and imparts gripping pressure to a conductor.

6. In a tap clamp of the character described, a clamp body having a hook; a nut opposite the hook; means on the body loosely and non-rotatably supporting the nut; a clamping bolt loosely threaded through the nut into the bight portion of the hook; and coacting means on the nut and body to impart lateral tilting or rocking movement to the nut relative to the bolt as the bolt is tightened, whereby the nut firmly grips the bolt to prevent stripping the threads or jarring loose due to ordinary vibrations.

7. In a tap clamp of the character described, a clamp body having a hook; a nut opposite the hook; means to prevent rotation of the nut relative to the clamp body; a clamping bolt loosely threaded through the nut and extending into the bight portion of the hook; and coacting means on the nut and body to tilt the nut into firm gripping engagement with the bolt when the bolt is tightened.

8. In combination with a tap clamp comprising a body having a conductor engaging hook, a screw clamping bolt extending loosely through the body opposite the bight portion of the hook; a conductor clamping member engaged by the end of said bolt; a nut non-rotatably carried by the body and loosely engaging the threads of the bolt; and canting means integral with the nut and engaging the body to tilt the nut laterally into firm gripping engagement with the bolt threads as the bolt is turned to tighten the clamp, thereby preventing loosening of the clamp due to vibrations and increasing the shearing resistance of the bolt and nut threads.

TOMLINSON F. JOHNSON.